Patented Jan. 26, 1932

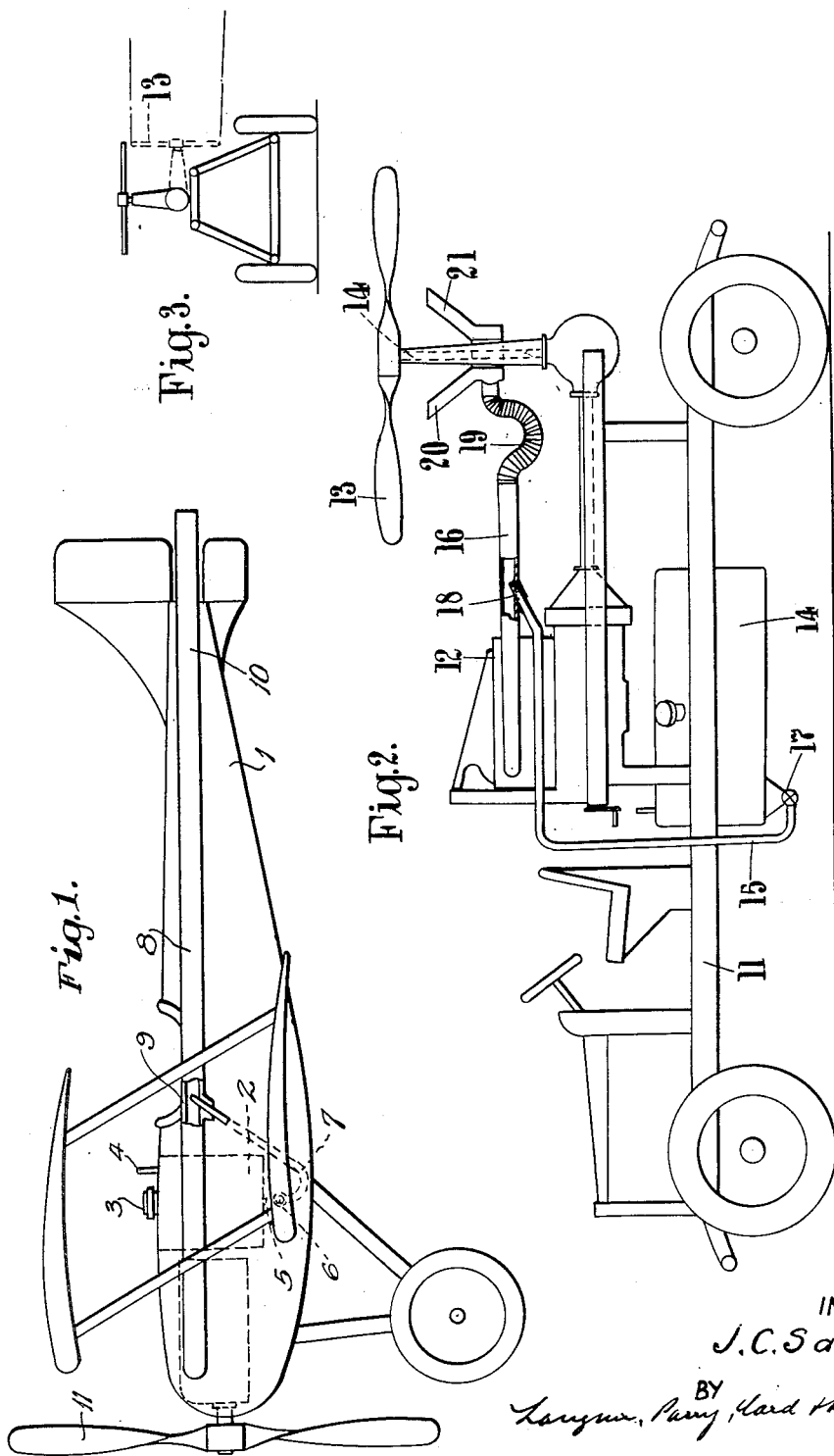

1,842,844

UNITED STATES PATENT OFFICE

JOHN CLIFFORD SAVAGE, OF LONDON, ENGLAND

TREATMENT OF GROWING PLANTS AND FOR OTHER LIKE PURPOSES

Application filed August 3, 1927, Serial No. 210,379, and in Great Britain August 10, 1926.

This invention has reference to the rapid treatment of growing plants from a fast moving vehicle such as an aeroplane having an internal combustion propelling engine for the prevention, arresting and/or destruction of fungoid or insect life and the like and is also applicable to the treatment of land or water for similar purposes.

An object of the present invention is to provide an improved apparatus for the treatment of growing plants occupying a relatively large area rapidly and in such wise that the plants or other area to be treated are coated with insecticide or fungicide in an extremely finely divided state or in what I may term a molecular condition so that it will adhere to the foliage or the like irrespective of the presence of dew or moisture on the foliage or the like and remain thereon even in the presence of rain.

A further object of the present invention is to equip an aircraft having an internal combustion propelling engine providing an abundant supply of hot exhaust gases with means enabling such gases to be employed for converting a suitable toxic material into a vaporous or gaseous condition the said toxic impregnated vapour or gas being directed into the atmosphere in such wise that due to the turbulence of the air created by the passage of the machine and by the propeller the toxic impregnated vapour is churned up and distributed over a wide area so that upon condensation a coating of toxic material settles upon every part of the plant or the like.

Further objects and advantages of the present invention will become apparent from the accompanying detailed description of two convenient forms of apparatus according to the invention.

In the accompanying drawings:

Figure 1 represents diagrammatically an aeroplane equipped with means for carrying my invention into practical effect Figure 2 is likewise a diagrammatic view of a motor-propelled land vehicle equipped for a like purpose and Figure 3 is a detail view hereinafter more particularly described.

Referring first to Figure 1 the aeroplane as a whole is designated by the reference numeral 1. Conveniently mounted within the machine is a tank 2 having a filler cap 3 and a pipe 4 for supply of compressed air from any appropriate source such as a pump operated by the engine (not shown). The tank 2 is shown as provided with a sump 5 and valve 6 from which a pipe 7 forms communication with the engine exhaust manifold 8. Preferably a jet or valve 9 is mounted at the junction of the pipe 7 and exhaust manifold 8 and a Bowden-wire mechanism or other suitable operating gear (not shown) is provided whereby the valve 6 may be controlled by an occupant of the aircraft. The exhaust manifold 8 is extended or provided with a pipe 10 terminating—in the construction shown—at the extreme rear of the machine beyond the rudder where it is open to the atmosphere. The reference numeral 11 indicates the usual air screw of the aeroplane.

In the operation of my invention the tank 2 is charged with a suitable substance or mixture inimical to insect life or fungoid and like growths either in a liquid or fused condition in which latter case the tank 2 may be provided with means whereby the hot gases of combustion from the engine may be caused to circulate around or within the tank to maintain the contents thereof in a fluid condition. The toxic substance or substances may be dissolved or held in suspension in an appropriate vehicle and the strength varied according to the nature of the insect or fungoid pest to be treated.

As an example of the treatment of growing crops with arsenious oxide ($AS_2O_3$) the tank 2 is charged through the filler cap 3 with an appropriate quantity of $AS_2O_3$ held in suspension in a suitable oil such as cotton seed oil or a suitable mineral oil may be used.

The aeroplane is flown at an appropriate altitude over the crop to be treated and the valve 6 opened by the occupant of the machine by means of its Bowden-wire or other control. The poison stored in the tank 2 flows into the exhaust manifold 8 due to the pressure introduced into the tank 2 through the pipe 4. As the poison-charged oil passes through the jet or valve 9 which may be of such a character as to cause it to be broken into the form of spray the hot combustion gases flowing in the exhaust manifold 8 causes sublimation of the $AS_2O_3$ and vaporization of the oil and a voluminous cloud of toxic-charged smoke or vapor is emitted into the atmosphere through the orifice of the pipe 10. As this smoke or vapor meets the colder air condensation or partial condensation ensues and innumerable minute particles of poison-charged oil are formed which being light do not immediately merely settle upon the leaves and foliage but float and are subjected to the disturbance of the air created by the slip stream of the aeroplane and also the currents of air created by the air screw so that said particles are caused ultimately to come in contact with and adhere to the crop under treatment. Owing to the oleaginous nature of the poison-charged particles they adhere to the foliage and stems of the crop and spread over the whole of the surfaces thereof forming a film calculated effectively to destroy insect life and fungoid growths and the toxic substance is not so likely to be washed off by rain as is the case where the poison is applied in an aqueous solution.

In Figure 2 I have illustrated diagrammatically an apparatus adapted for use on land for carrying my invention into effect and its operation will be understood readily from the description hereinbefore given in connection with Figure 1 of the drawings. In Figure 2 the reference numeral 11 indicates the chassis of a lorry upon which is mounted an internal combustion engine 12 adapted to drive through any suitable and well known transmission gear an appropriate air screw 13. The tank 14 for the storage of the toxic substance is mounted upon the chassis and a pipe 15 forms communication between said tank and the exhaust manifold 16 of the engine a sump and a valve 17 controllable by an occupant of the vehicle being conveniently located in connection with the tank as shown. The pipe 15 where it enters the exhaust manifold 16 is preferably provided with a jet 18 which as in the construction previously described may be such as to deliver the toxic substance into the exhaust manifold in the form of spray. Connected to the exhaust manifold 16 preferably by means of a flexible connection 19 is a distributing member which as here illustrated comprises two branch pipes 20 and 21 through which the poison-charged smoke or vapor is emitted the rotating air screw 13 directing said smoke or vapor vertically as for instance when required for spraying the surfaces of foliage at some height from the ground.

In order that a cloud of poison-charged smoke or vapor may be directed horizontally instead of vertically the air screw shaft 14 and its gear may be so constructed and arranged as to permit the air screw 13 to rotate in a vertical plane as shown in dotted lines in Figure 3 or at an angle so as to project the toxic-charged smoke or vapor in the desired direction and any well known arrangement of gearing may be utilized for this purpose.

The particular means hereinbefore described for producing a poison-charged smoke or vapor and directing it onto the foliage or plants to be treated are given for the purpose of explaining how my invention may be conveniently carried into practice but I do not wish to be understood as limiting myself to the precise means herein described as various alternative methods to those described will readily suggest themselves to those skilled in the art for instance while I have referred to the use of $AS_2O_3$ and an oleaginous vehicle it may be desirable according to the nature of the crop to be treated to employ a fungicide or insecticide which can best be applied when held in suspension in a vehicle as for example precipitated copper carbonate or copper hydrate ground in a suitable smoke forming oil. When the oil is converted by heat into smoke or vapor each particle thereof becomes charged with a portion of the copper compound previously held in suspension in the oil and the particles of poison-charged smoke settle upon the foliage. Again the toxic substance or material in powder form or dissolved or suspended in a suitable vehicle may be introduced into a chamber heated by the exhaust gases of an internal combustion engine and a smoke forming material simultaneously introduced so that a poison-charged smoke or vapor is produced which is directed into the atmosphere in the region of the foliage or the like to be treated.

It will be manifest that under my invention I am enabled to treat growing plants in the open ground and occupying a relatively large area such as rubber trees cotton fields potatoes hops fruit trees and other crops in a rapid and efficient manner for the elimination and/or prevention of insect and fungoid pests.

What I claim and desire to secure by Letters Patent of the United States is:

1. Apparatus for treating growing plants or the like comprising a vehicle having an internal combustion engine, a pipe for conveying the exhaust gases from said engine into the atmosphere, a receptacle for toxic material, a conduit for conveying said material from said receptacle to said pipe, and means adjacent the discharge end of said conduit for breaking up said material into spray-like form as it is discharged therefrom whereby said material is first vaporized by the heat of said exhaust gases and is subsequently discharged into the atmosphere where it condenses and is deposited on the plants in a finely divided and adherent form.

2. For rapidly treating growing plants and the like occupying a relatively large area, an aircraft comprising an internal combustion propelling engine, a pipe for conveying the exhaust gases of said engine into the atmosphere, a receptacle for toxic material, a conduit for conveying said material from said receptacle into said pipe, means for regulating the discharge of said material from said receptacle, and means adjacent the discharge end of said conduit for converting said material into spray-like form as it is discharged into said pipe whereby said material is converted into vapor by said exhaust gases and is subsequently discharged into the atmosphere where it condenses and is deposited on said plants and the like in finely divided and adherent form.

3. Apparatus for treating growing plants or the like comprising a vehicle equipped with an internal combustion engine, a pipe for conveying the exhaust gases of said engine into the atmosphere, a receptacle for toxic material, a conduit for conveying said material to a point of discharge so disposed as to enable heat exchange to be effected between said gases and said material to produce a toxic impregnated vapour, and means for dispersing said vapour over a wide area in the atmosphere whereby condensation thereof is effected and said material is deposited on said plants in a finely divided and adherent form.

4. Apparatus for treating growing plants or the like comprising a vehicle equipped with an internal combustion propelling engine, a pipe for conveying the exhaust gases of said engine into the atmosphere, a receptacle for toxic material, a conduit for conveying said material to a point of discharge so disposed as to enable heat exchange to be effected between said gases and said material to produce toxic impregnated vapour and an air screw for dispersing said vapour over a wide area in the atmosphere whereby condensation thereof is effected and said material is deposited on said plants in a finely divided and adherent form.

In testimony whereof I have signed my name to this specification.

JOHN CLIFFORD SAVAGE.